US012693735B1

(12) United States Patent
Ikkai et al.

(10) Patent No.: US 12,693,735 B1
(45) Date of Patent: Jul. 28, 2026

(54) USER COMFORT MONITORING AND NOTIFICATION

(71) Applicant: Apple Inc., Cupertino, CA (US)

(72) Inventors: Akiko Ikkai, San Jose, CA (US);
Grant H Mulliken, Los Gatos, CA
(US); Izzet B Yildiz, Sunnyvale, CA
(US); Sterling R Crispin, Santa Cruz,
CA (US)

(73) Assignee: Apple Inc., Cupertino, CA (US)

( * ) Notice: Subject to any disclaimer, the term of this
patent is extended or adjusted under 35
U.S.C. 154(b) by 0 days.

(21) Appl. No.: 19/077,775

(22) Filed: Mar. 12, 2025

Related U.S. Application Data

(63) Continuation of application No. 18/235,558, filed on
Aug. 18, 2023, now Pat. No. 12,277,262, which is a
continuation of application No. 17/845,412, filed on
Jun. 21, 2022, now Pat. No. 11,762,457, which is a
continuation of application No. 17/030,622, filed on
Sep. 24, 2020, now abandoned.

(60) Provisional application No. 62/991,273, filed on Mar.
18, 2020, provisional application No. 62/907,124,
filed on Sep. 27, 2019.

(51) Int. Cl.
*G06F 3/01* (2006.01)
*G06V 40/16* (2022.01)

(52) U.S. Cl.
CPC .............. *G06F 3/012* (2013.01); *G06F 3/015*
(2013.01); *G06V 40/174* (2022.01)

(58) Field of Classification Search
CPC ........ G06F 3/012; G06F 3/015; G06V 40/174
See application file for complete search history.

(56) References Cited

U.S. PATENT DOCUMENTS

| | | | |
|---|---|---|---|
| 10,120,413 B2 | 11/2018 | Aimone et al. | |
| 10,127,728 B2 | 11/2018 | Osman | |
| 10,800,043 B2 | 10/2020 | Park et al. | |
| 10,860,103 B2 | 12/2020 | Kacelenga | |
| 11,762,457 B1 | 9/2023 | Ikkai | |
| 12,277,262 B1 | 4/2025 | Ikkai | |
| 2014/0201207 A1 | 7/2014 | Sadowsky et al. | |
| 2015/0208986 A1 | 7/2015 | Gottesman | |
| 2016/0278444 A1 * | 9/2016 | Jordan ................... | A41D 1/002 |
| 2017/0007165 A1 | 1/2017 | Jain et al. | |
| 2017/0071551 A1 | 3/2017 | Jain et al. | |

(Continued)

FOREIGN PATENT DOCUMENTS

| | | | | |
|---|---|---|---|---|
| AU | 2016205850 A1 * | 7/2017 | .......... | A61B 5/0205 |
| CN | 110874869 B | 11/2020 | | |

(Continued)

OTHER PUBLICATIONS

Jiang, Shiqi, Zhou, Pengfei, Li, Zhenjiang and Li, Mo; "Memento:
An Emotion Driven Lifelogging System with Wearables"; 2017—
pp. 1-9. 2017.

(Continued)

*Primary Examiner* — Robert J Michaud
(74) *Attorney, Agent, or Firm* — Thompson Hine LLP

(57) ABSTRACT

Some implementations disclosed herein present multimedia
content to a user, identify a comfort state of the user (e.g.,
happy, unhappy, distressed, etc.) based on body data of the
user (e.g., facial expressions, hand movements, physiologi-
cal data, etc.), and update the multimedia content based on
the identified comfort state.

20 Claims, 6 Drawing Sheets

100

(56)         References Cited

U.S. PATENT DOCUMENTS

| | | |
|---|---|---|
| 2017/0330023 A1 | 11/2017 | Gordon |
| 2017/0337742 A1 | 11/2017 | Powderly et al. |
| 2018/0189568 A1* | 7/2018 | Powderly ............. G06V 30/194 |
| 2018/0255167 A1 | 9/2018 | Saito |
| 2018/0301054 A1 | 10/2018 | Banerji |
| 2018/0303396 A1 | 10/2018 | Wild |
| 2019/0019089 A1 | 1/2019 | Baughman et al. |
| 2019/0138096 A1 | 5/2019 | Lee et al. |
| 2019/0163258 A1 | 5/2019 | Baughman et al. |
| 2019/0206440 A1 | 7/2019 | Newell |
| 2019/0208287 A1 | 7/2019 | Newell |
| 2019/0223746 A1 | 7/2019 | Intrator |
| 2019/0384392 A1 | 12/2019 | Aimone et al. |
| 2020/0008725 A1 | 1/2020 | Bach et al. |
| 2020/0057783 A1 | 2/2020 | Ricci |
| 2020/0175123 A1 | 6/2020 | Roberts |
| 2020/0201434 A1 | 6/2020 | Aliamiri |
| 2020/0294652 A1 | 9/2020 | Burdea |
| 2020/0315510 A1 | 10/2020 | Johnson |
| 2020/0356136 A1 | 11/2020 | Aimone et al. |
| 2020/0373001 A1 | 11/2020 | Harrison et al. |
| 2021/0400142 A1 | 12/2021 | Jorasch |
| 2023/0355090 A1 | 11/2023 | Yale |
| 2024/0164672 A1 | 5/2024 | Pasley |

FOREIGN PATENT DOCUMENTS

| | | |
|---|---|---|
| WO | 2016110804 A1 | 7/2016 |
| WO | 2018121463 | 7/2018 |
| WO | 2019067731 A1 | 4/2019 |
| WO | 2020175759 A1 | 9/2020 |
| WO | 2022212052 A1 | 10/2022 |

OTHER PUBLICATIONS

Parsons, T.D. and Reinebold, J.L., "Adaptive Virtual Environments for Neuropsychological Assessment in Serious Games," IEEE Transactions on Consumer Electronics, vol. 58, No. 2, pp. 197-204, May 2012 2012.

* cited by examiner

700

USER COMFORT MONITORING AND NOTIFICATION

CROSS-REFERENCE TO RELATED APPLICATION

This application is a Continuation of U.S. patent application Ser. No. 18/235,558 filed Aug. 18, 2023, which is a Continuation of U.S. patent application Ser. No. 17/845,412 filed Jun. 21, 2022, (Now U.S. Pat. No. 11,762,457), which is a Continuation of U.S. patent application Ser. No. 17/030, 622 filed Sep. 24, 2020 (now abandoned), which claims the benefit of U.S. Provisional Application Ser. No. 62/991,273 filed Mar. 18, 2020, and U.S. Provisional Application Ser. No. 62/907,124 filed Sep. 27, 2019, each of which are incorporated herein by reference in its entirety.

TECHNICAL FIELD

The present disclosure generally relates to displaying content on electronic devices, and in particular, to systems, methods, and devices for assessing the comfort state of users viewing content displayed on electronic devices.

BACKGROUND

A user's comfort state while viewing content on an electronic device can have a significant effect on the user's experience. For example, a user may experience an increase or a decrease in comfort state while using a head-mounted device (HMD) in a computer-generated reality (CGR) environment, such as watching entertaining content or interacting with other users. Improved techniques for assessing the comfort state of a user viewing and interacting with content may enhance the user's enjoyment of the content. Accordingly, based on determining the user's comfort state, content creators and display systems may be able to provide better and more tailored user experiences.

SUMMARY

Attributes of content may result in or contribute to a comfort state of a user while the user is viewing or interacting with a multimedia environment. Moreover, data regarding a body of the user (e.g., facial expressions, hand movements, physiological data, etc.) captured via camera, microphone, computer vision, motion sensors, or other physiological sensors may be used to determine that the comfort state of the user. For example, a camera facing the user may be used to capture facial expressions or body movements of the user. The captured facial expressions or body movements may be decoded or identified as being associated with one or more particular comfort states. The multimedia environment may then be updated based on determining the comfort state of the user.

For example, a computer-generated reality (CGR) environment may be presented to the user on a head-mounted device (HMD) or a mobile device and may involve multiple users interacting with one another and the content of the environment. In some implementations, data regarding the body of the user is detected or recorded by one or more sensors. For example, microphones may record user sounds, inward facing cameras may record eye characteristics, downward-facing cameras may record facial expressions, or image-based hand/body tracking may be used to identify movements. Moreover, the data regarding the body of the user may be decoded into comfort states and may be used to classify if the user is in a particular comfort state. In some implementations, one or more additional sensors or types of input (e.g., camera, motion sensor, heart rate sensor, pulse oximeter, blood pressure sensor, temperature sensor, electro-cardiogram sensor, etc.) may be used to classify comfort state (e.g., one or more states) or increase the accuracy of classification of comfort state. For example, a machine learning algorithm may classify the comfort state based on the user's sounds (e.g., tone of voice, spoken language, utterances, breathing, etc.), eye characteristics, facial expressions, body movements, and other physiological data (e.g., heartrate, temperature, electro-cardiogram, etc.). Users will have the option to opt in or out with respect to whether his or her user data is obtained or used or to otherwise turn on and off any features that obtain or use user information. Moreover, each user will have the ability to access and otherwise find out anything that the system has collected or determined about him or her. User data is stored securely on the user's device. For example, user data associated with the user's body and/or comfort state may be stored in a secure enclave on a user's device, restricting access to the user data and restricting transmission of the user data to other devices.

In some implementations, a context of the multimedia content is used to determine the comfort state of the user while viewing the multimedia environment. For example, the setting of the content, information about the user's sensitivities and past responses, and attributes of the content (e.g., certain words, detected bullying activity, etc.) may be used to classify the comfort state of the user and/or to notify the user that there might be something that cause discomfort. In some implementations, a factor affecting the comfort state is identified in the multimedia environment. For example, an activity or characteristic of a second user participating in the multimedia environment (e.g., co-presence or shared CGR environment) may be identified as a factor for, or being associated with, the comfort state of the user. Moreover, an activity or characteristic of the second user may be associated with the comfort state of the user based on a temporal or spatial relationship between the activity or characteristic of the second user and the user.

In some implementations, updating the multimedia environment includes displaying a message to make the user aware of his or her comfort state, suggesting a break, providing an option to block content or individuals, providing an option to report, offering alternative content; or notifying a guardian/moderator. In some implementations, updating the multimedia environment includes updating the environment of another user. For example, the multimedia representation of another user may be updated to include a warning message, an interaction restraint, or a degraded avatar. In some implementations, the content creator collects or receives data, based on privacy settings, in order to optimize the multimedia experience of the user. For example, the content creator may save associated data, flag content for review, label content, or warn other users having the same or similar sensitivity.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
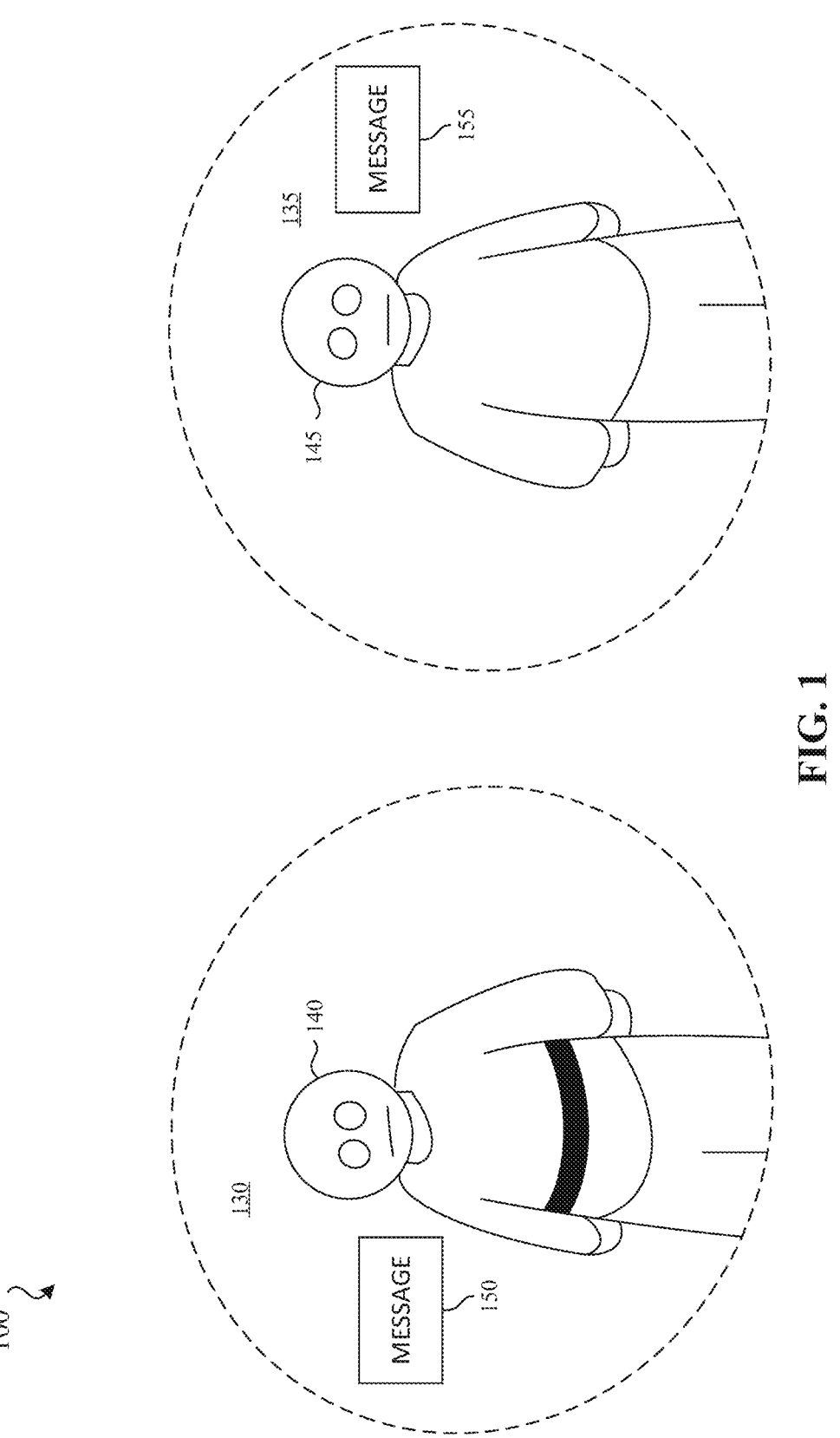
FIG. 1 illustrates a physical environment including users and devices in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example of views 130, 135 of users using devices to view one another in a physical environment. A physical environment refers to a physical world that people can sense and/or interact with without aid of electronic systems. Physical environments, such as a physical park, include physical articles, such as physical trees, physical buildings, physical locations, and physical people. People can directly sense and/or interact with the physical environment, such as through sight, touch, hearing, taste, and smell.

In some implementations, a device used by one or both of the users is configured to manage, coordinate, and, present a computer-generated reality (CGR) environment. In some implementations, the device includes a suitable combination of software, firmware, or hardware. An example of such a device is described in greater detail below with respect to FIG. 4 and FIG. 5. In some implementations, a controller of the device is a computing device that is local or remote relative to the physical environment. In some implementations, the functionalities of the controller of the device are provided by or combined with the device, for example, in the case of a head-mounted device (HMD) that functions as a stand-alone unit.

In one example, a controller of the device is a local server located within the physical environment. In another example, the controller of the device is a remote server located outside of the physical environment (e.g., a cloud server, central server, etc.). In some implementations, the controller of the device is communicatively coupled with the device via one or more wired or wireless communication channels (e.g., BLUETOOTH, IEEE 802.11x, IEEE 802.16x, IEEE 802.3x, etc.).

According to some implementations, the device presents a CGR environment to a user while the user is present within the physical environment. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the device is configured to obtain image data or physiological data (e.g., pupillary data, electrocardiography (EKG) data, etc.) about a body of the user via one or more in device or external sensors. In some implementations, the inputs used by the device to collect data about a body of the user include cameras (e.g., to detect body language, perform hand-tracking, identify facial expressions, etc.), microphones (e.g., to identify tone of voice, spoken language, utterances, breathing, etc.), and physiological sensors (e.g., to measure pupil size, gaze, electroencephalography (EEG), EKG, electromyography (EMG), functional near infrared spectroscopy signal (fNIRS), galvanic skin response (GSR), pulse, respiratory rate, etc.). Moreover, in some implementations, the device may also determine content or context of the multimedia environment 130 (e.g., a location of the user, language, tone of voice, pictures and videos, etc.).

In some implementations, the device may associate the captured image data or physiological data with a comfort state of the user. For example, the device may analyze various factors to determine in real time whether the user is experiencing an feeling (e.g., happiness, sadness, distress, etc.). In some implementations, the body language of the user is modeled using user position data, combined with hand tracking technologies, and inferred or measured body posture. In some implementations, the device utilizes a computational model of comfort state assessment, including detecting the body language associated with a comfort state, and any corresponding physiological signs of the comfort state. For example, combining body language detection, such as "shielding" with the arms, with an increased heart rate may provide a heightened indicator the user is in genuine distress and not engaged in play.

Users will have the option to opt in or out with respect to whether his or her user data is obtained or used or to otherwise turn on and off any features that obtain or use user information. Moreover, each user will have the ability to access and otherwise find out anything that the system has collected or determined about him or her. User data is stored securely on the user's device. For example, user data associated with the user's body and/or comfort state may be stored in a secure enclave on a user's device, restricting access to the user data and restricting transmission of the user data to other devices.

In some implementations, a device updates the multimedia environment 130 based on the comfort state of the user. For example, the device may update the multimedia environment 130 to include a message 150, such as presenting the user with a suggestion to take a break (e.g., in response to determining that the user is upset or tired). Moreover, because the environment may cause the user to experience a heightened sense of presence and connection to the multimedia environment, detection of a negative comfort state may allow the device to help the user avoid an undesirable experience.

In some implementations, the device may use determination of the comfort state of the user to decrease latency to bring the user to psychological safety or create awareness of certain content or interactions when the user may otherwise be unaware of his or her comfort state. In some implementations, the device may present the user with an ability to customize an escape methodology from the context, or provide parental control settings (e.g., proactive and retroactive). For example, the user may specify a duration for any remedial actions, set a filtering level for content, or be subject to parental control settings. Moreover, the user may be provided with an option to report the content, interaction, or comfort state to a content developer associated with the multimedia environment 130. In some implementations, the device updates the multimedia environment 130 to include a message 150 offering positive or mood elevating content.

In some implementations, a second user may view a multimedia environment 135 in the physical environment. Furthermore, in some implementations the multimedia environment 130 presented to the first user includes an avatar 140 of the second user. Conversely, in some implementations, the multimedia environment 135 presented to the second user includes an avatar 145 of the first user.

In some implementations, a device may determine that an action of the second user is associated with the reaction or comfort state of the first user. For example, the device may identify actions (e.g., body language, close proximity, hitting motions, etc.) or language (e.g., certain words may be recognized by a speech recognition algorithm) of the second user as impacting the comfort state of the first user. In some implementations, indicators of such behavior include proximity of the second user to the first user, the second user acting in a threatening or bullying way, that the first user is looking at the second user or a part of the second user (e.g., the two way or one way eye contact between the users indicating dominance or aggression), the second user stepping forward at the same time the first user steps backwards, etc.

As illustrated in FIG. 1, in some implementations the second device may update the multimedia environment 130 to include a cautionary message 150 beside a representation of the second user (e.g., avatar 140). Similarly, the second device may update the multimedia environment 135 to include a message 155 beside a representation of the first user (e.g., avatar 145). In some implementations, a moderator may be notified and, if one or both of the users fall within an age of parental consent, a parent or guardian may be notified regarding the comfort state of the user(s) or any associated actions. Moreover, in some implementations, another user may be prohibited or restricted from further actions or interactions that may negatively impact a comfort state of another user. For example, the avatar 140 of the second user may be degraded or limited based on certain behavior in the multimedia environment 135.

In some implementations, subject to privacy settings, a device may identify a context or content of the multimedia environment 130 as potentially impacting or causing a comfort state of the user. For example, if photos or multimedia are shared between users in a social context, the content or origin of content may be analyzed and classified as contributing to the overall social context as either positive or negative.

In some implementations, subject to privacy settings, data (e.g., what was said, tone of voice, body language, context) is saved on a device or saved remotely for use by a content creator or developer. For example, an incident involving a negative comfort state may be manually reviewed by content moderators and integrated into a machine learning model of bullying which may be personalized to each user. Moreover, created content may be automatically labeled as offensive or distressing to certain users.

Figure 2:
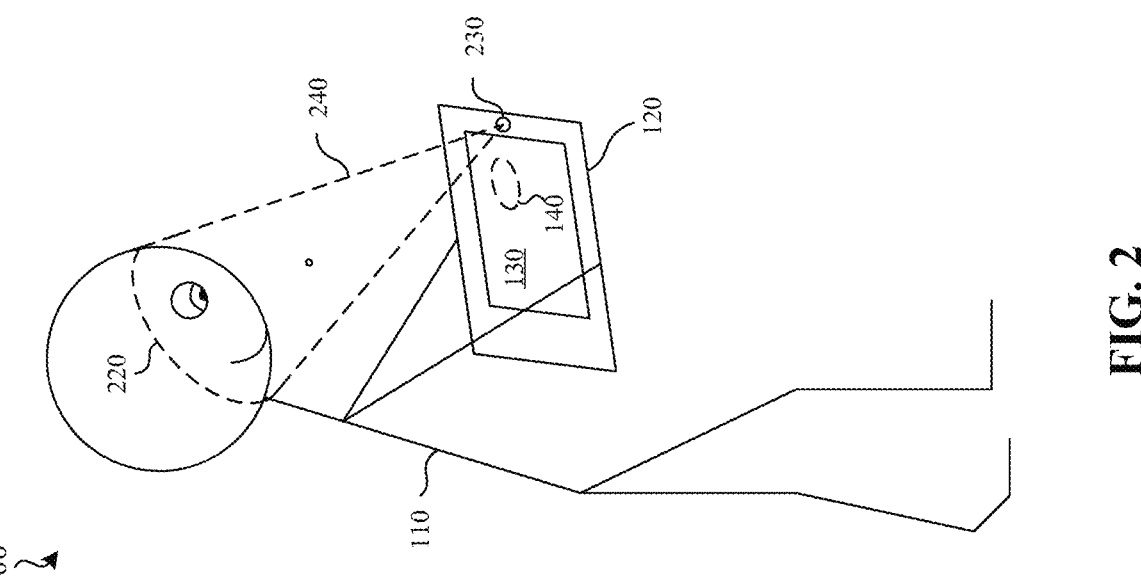
FIG. 2 illustrates a device displaying content and obtaining physiological data from a user in accordance with some implementations.

As shown in FIG. 2, in some implementations a device 120 is a handheld electronic device (e.g., a smartphone or a tablet) and captures data 240 from the first user. In some implementations the device 120 is a laptop computer or a desktop computer. In some implementations, the device 120 has a touchpad and, in some implementations, the device 120 has a touch-sensitive display (also known as a "touch screen" or "touch screen display"). In some implementations, the device 120 is a wearable head mounted display ("HMD").

In some implementations, the device 120 includes a body tracking system for detecting facial expressions, hand motions, or other body movements. For example, a facial expression tracking system of an HMD may include an inward facing camera (e.g., near-IR ("NIR") camera), and an illumination source (e.g., an NIR light source) that emits light (e.g., NIR light) towards the face of the user 110. Moreover, the illumination source of the HMD may emit NIR light to illuminate the eyes of the user 110 and the NIR camera may capture images of the eyes of the user 110. In some implementations, images captured by the facial expression tracking system may be analyzed to detect position and movements of the facial features or facial parts of the user 110, or to detect other information about the expression of the user. For example, the position of the user's eyelids or mouth may indicate a facial expression (e.g., smile or a grimace) associated with content shown on the near-eye display of the HMD.

In some implementations, the device 120 presents an experience in which a multimedia environment 130 is displayed on a display of the device 120 during a user experience. A sensor 230 detects data 240 regarding the body of the user 110 during the user experience. In some implementations, the device 120 employs various physiological sensors, detection, or measurement systems. Detected physiological data may include, but is not limited to, EEG, EKG, EMG, fNIRS, GSR, pulse, respiratory rate, blood pressure, or pupillary response. Moreover, the device 120 may simultaneously detect multiple forms of data 240 in order to benefit from synchronous acquisition of data 240. Moreover, in some implementations, the data 240 represents involuntary data, i.e., responses that are not under conscious control (e.g., pupillary response or skin conductance).

Figure 3:
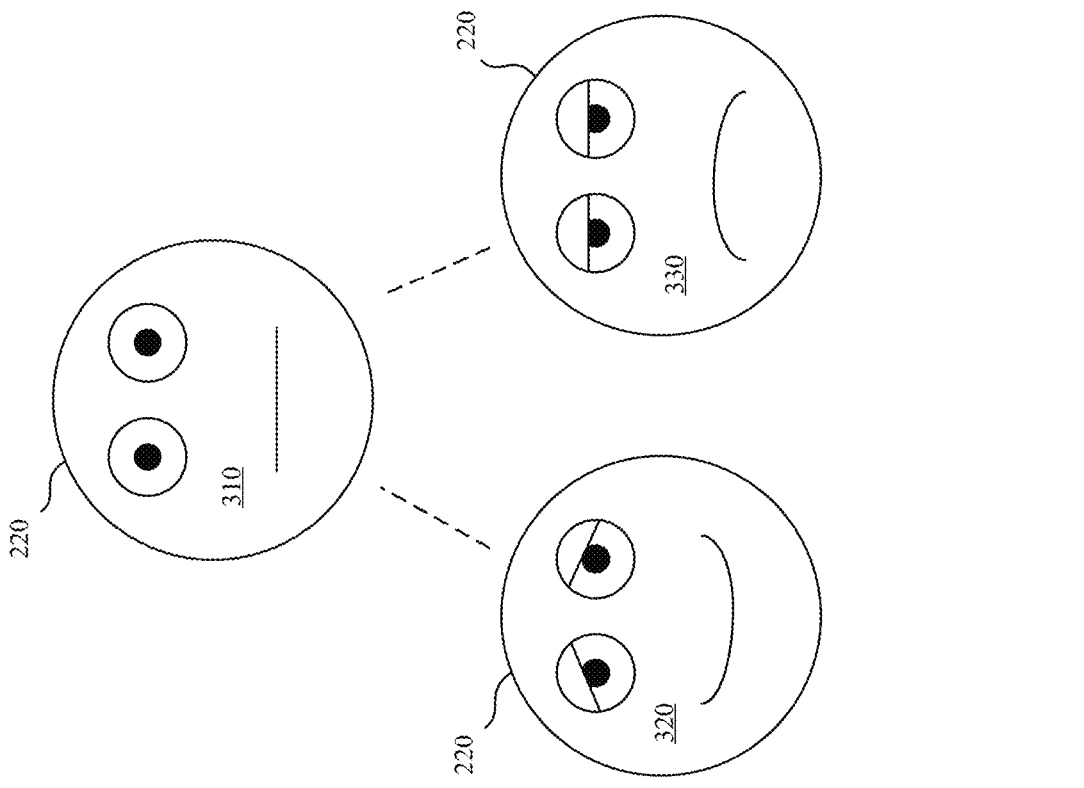
FIG. 3 illustrates a face of the user of FIGS. 1 and 2 in which the facial expression of the user varies with time.

FIG. 3 illustrates a face 220 of the user 110 in which the body data 240 (e.g., facial expressions) varies with time. As shown in FIG. 3, a present facial expression 320 or 330 may vary in contrast to a past facial expression 310. For example, the present facial expression 320 or 330 may include changes in facial features associated with the mouth or the eyes of the user 110.

In some implementations, one or more facial expressions of the user 110 are classified and associated with a comfort state of the user 110. For example, an upturned mouth (e.g., facial expression 320) may be classified as a smile or a downturned mouth may be classified as a frown (e.g., facial expression 330). Moreover, the smile may be associated with a comfort state of "happy" and the frown may be associated with the comfort state of "sad" or "unhappy". In some implementations, the data 240 regarding the body of the user 110 may include baseline data specific to the user 110. For example, a user may have a resting face that includes a downturned mouth and therefore a frown may represent a "neutral" comfort state for such a user. In some implementations, the device 120 may detect patterns of data 240 representing time-varying facial expressions, body movements, or other physiological data.

In some implementations, the data 240 regarding the body of the user 110 may vary in time and the device 120 may detect a pattern. In some implementations, the pattern is a change in data 240 from one time to another time, and, in some other implementations, the pattern is series of changes over a period of time. Based on detecting the pattern, the device 120 may identify a change in the comfort state of the user 110. For example, the device 120 may utilize a model trained to determine that the comfort state of the user 110 is changing. In some implementations, a machine learning model (e.g., a trained neural network) is applied to identify patterns in data 240. Moreover, the machine learning model may be used to match the patterns with learned patterns corresponding to comfort states of the user 110. The device 120 may learn patterns specific to the particular user 110. For example, the device 120 may learn from determining that a particular pattern of data 240 represents a particular comfort state of the user 110 and use this information to adapt the model to subsequently identify the particular pattern of data 240 as another manifestation of the particular comfort state of the user 110. Such learning can consider the user's interactions that may confirm classifications of comfort states, e.g., if the device 120 identifies a particular comfort state and the user confirms the identification, the model can be updated accordingly.

User data that is used as input to a machine learning model is stored securely on the user's device, for example, to ensure the user's privacy. The user's device may have a secure storage area, e.g., a secure enclave, for securing certain user information, e.g., data from image and other sensors that is used for face identification, face identification, or biometric identification. The user data associated with the user's body and/or comfort state may be stored in such a secure enclave, restricting access to the user data and restricting transmission of the user data to other devices to ensure that user data is kept securely on the user's device. User data may be prohibited from leaving the user's device and may be used only in machine learning models and other processes on the user's device.

In some implementations, the body data of the user is compared with the user's own prior body data to determine the user's comfort state. In some implementations, the comfort state of the user is assessed based on comfort states of multiple users when viewing various types of multimedia content, e.g., comparing the user's response with a typical or average user response to similar content. Observing repeated responses of the user to multimedia content may also provide insights about the underlying comfort state of the user in regard to varying multimedia content.

Figure 4:
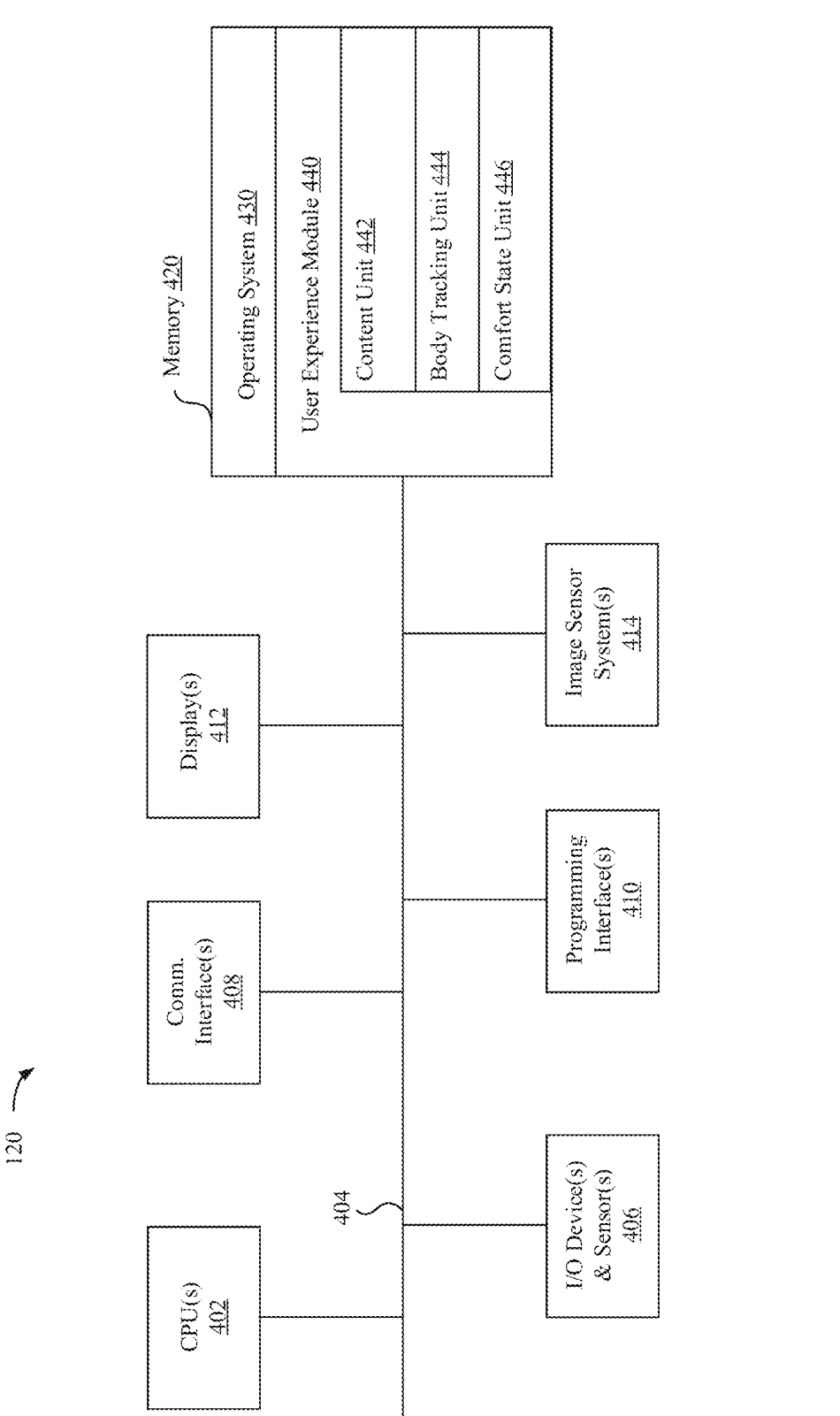
FIG. 4 is a block diagram illustrating device components of an exemplary device according to some implementations.

FIG. 4 is a block diagram of an example of a device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 410, one or more displays 412, one or more interior and/or exterior facing image sensor systems 414, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 412 are configured to present a user experience to the user 110. In some implementations, the one or more displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), microelectromechanical system (MEMS), a retinal projection system, and/or the like display types. In some implementations, the one or more displays 412 correspond to diffractive, reflective, polarized, holographic, etc. waveguide displays. In one example, the device 120 includes a single display. In another example, the device 120 includes a display for each eye of the user 110, e.g., an HMD. In some implementations, the one or more displays 412 are capable of presenting CGR content.

In some implementations, the one or more image sensor systems 414 are configured to obtain image data that corresponds to at least a portion of the face of the user 110 that includes the eyes of the user 110. For example, the one or more image sensor systems 414 include one or more RGB camera (e.g., with a complimentary metal-oxide-semiconductor (CMOS) image sensor or a charge-coupled device (CCD) image sensor), monochrome camera, IR camera, event-based camera, and/or the like. In various implementations, the one or more image sensor systems 414 further include illumination sources that emit light upon the portion of the face of the user 110, such as a flash or a glint source.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a user experience module 440.

The operating system 430 includes procedures for handling various basic system services and for performing hardware dependent tasks. In some implementations, the user experience module 440 is configured to display content on electronic devices assess the cognitive states of users viewing such content. To that end, in various implementations, the user experience module 440 includes a content unit 442, a body tracking unit 444, and a comfort state unit 446.

In some implementations, the content unit 442 is configured to provide and/or track content for display on a device. The content unit 442 may be configured to monitor and track the context of the content over time and/or to identify user interactions that occur within the content. In some implementations, the content unit 442 may be configured to tailor content to a specific user using one or more of the techniques discussed herein or as otherwise may be appropriate. To these ends, in various implementations, the unit includes instructions and/or logic therefor, and heuristics and metadata therefor.

In some implementations, the body tracking (e.g., body language, hand-tracking, facial expressions, physiological data, etc.) unit 444 is configured to track a user's body movement or other physiological attributes using one or more of the techniques discussed herein or as otherwise may be appropriate. To these ends, in various implementations, the unit includes instructions and/or logic therefor, and heuristics and metadata therefor.

In some implementations, the comfort state unit 446 is configured to assess the comfort state of a user based on a physical (e.g., body) response using one or more of the techniques discussed herein or as otherwise may be appropriate. To these ends, in various implementations, the unit includes instructions and/or logic therefor, and heuristics and metadata therefor.

Although the units and modules of FIG. 4 are shown as residing on a single device (e.g., the device 120), it should be understood that in other implementations, any combination of these units may be located in separate computing devices.

Moreover, FIG. 4 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 5:
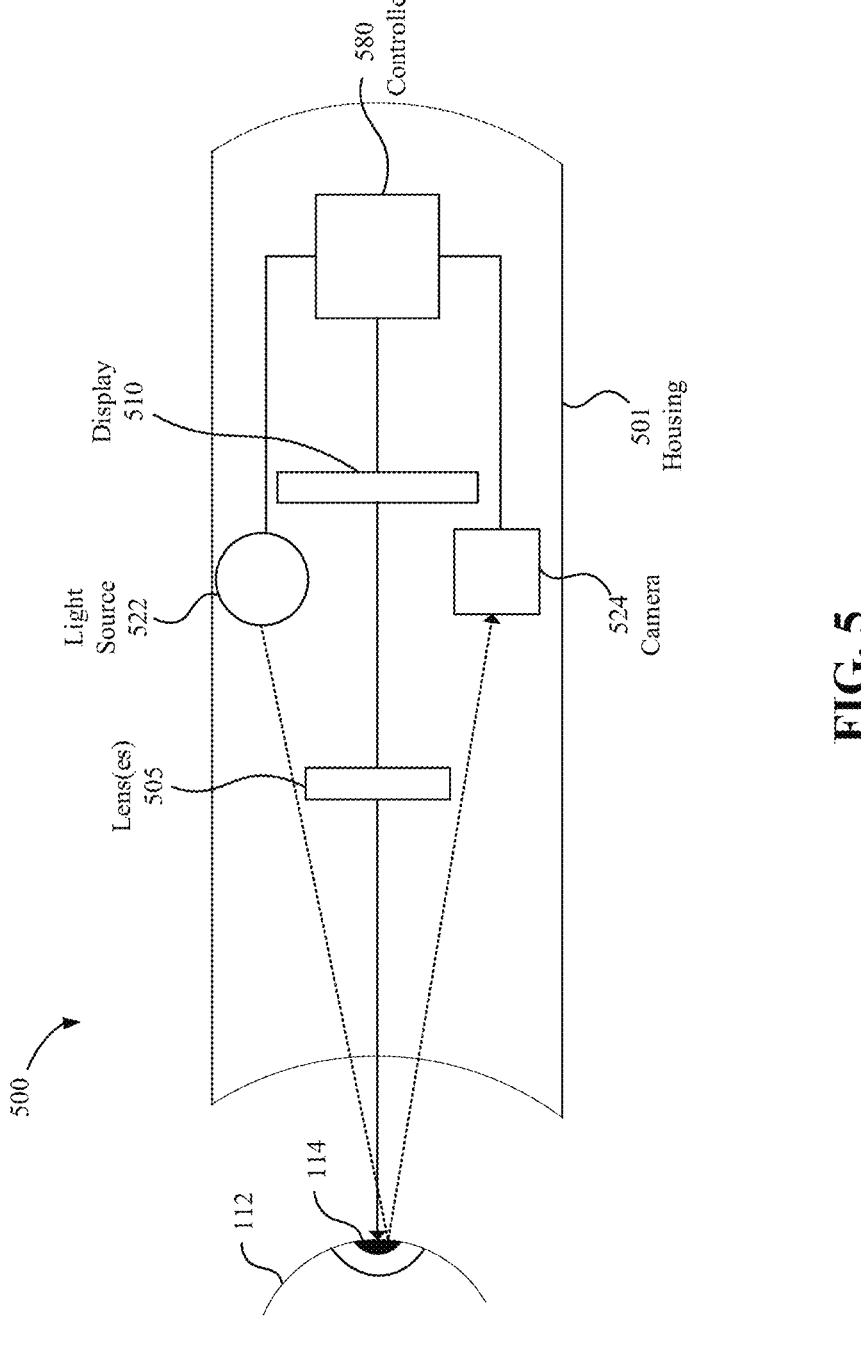
FIG. 5 is a block diagram of an example head-mounted device (HMD) in accordance with some implementations.

FIG. 5 illustrates a block diagram of an exemplary head-mounted device 500 in accordance with some implementations. The head-mounted device 500 includes a housing 501 (or enclosure) that houses various components of the head-mounted device 500. The housing 501 includes (or is coupled to) an eye pad (not shown) disposed at a proximal (to the user 110) end of the housing 501. In various implementations, the eye pad is a plastic or rubber piece that comfortably and snugly keeps the head-mounted device 500 in the proper position on the face of the user 110 (e.g., surrounding the eye of the user 110).

The housing 501 houses a display 510 that displays an image, emitting light towards or onto the eye of a user 110. In various implementations, the display 510 emits the light through an eyepiece having one or more lenses 505 that refracts the light emitted by the display 510, making the display appear to the user 110 to be at a virtual distance farther than the actual distance from the eye to the display 510. For the user 110 to be able to focus on the display 510, in various implementations, the virtual distance is at least greater than a minimum focal distance of the eye.

The housing 501 also houses a tracking system including one or more light sources 522, camera 524, and a controller 580. The one or more light sources 522 emit light onto the eye of the user 110 that reflects as a light pattern (e.g., a circle of glints) that can be detected by the camera 524. Based on the light pattern, the controller 580 can determine an eye tracking characteristic of the user 110. For example, the controller 580 can determine a gaze direction and/or a blinking state (eyes open or eyes closed) of the user 110. As another example, the controller 580 can determine a pupil center, a pupil size, or a point of regard. Thus, in various implementations, the light is emitted by the one or more light sources 522, reflects off the eye of the user 110, and is detected by the camera 524. In various implementations, the light from the eye of the user 110 is reflected off a hot mirror or passed through an eyepiece before reaching the camera 524.

The display 510 emits light in a first wavelength range and the one or more light sources 522 emit light in a second wavelength range. Similarly, the camera 524 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

Figure 6:
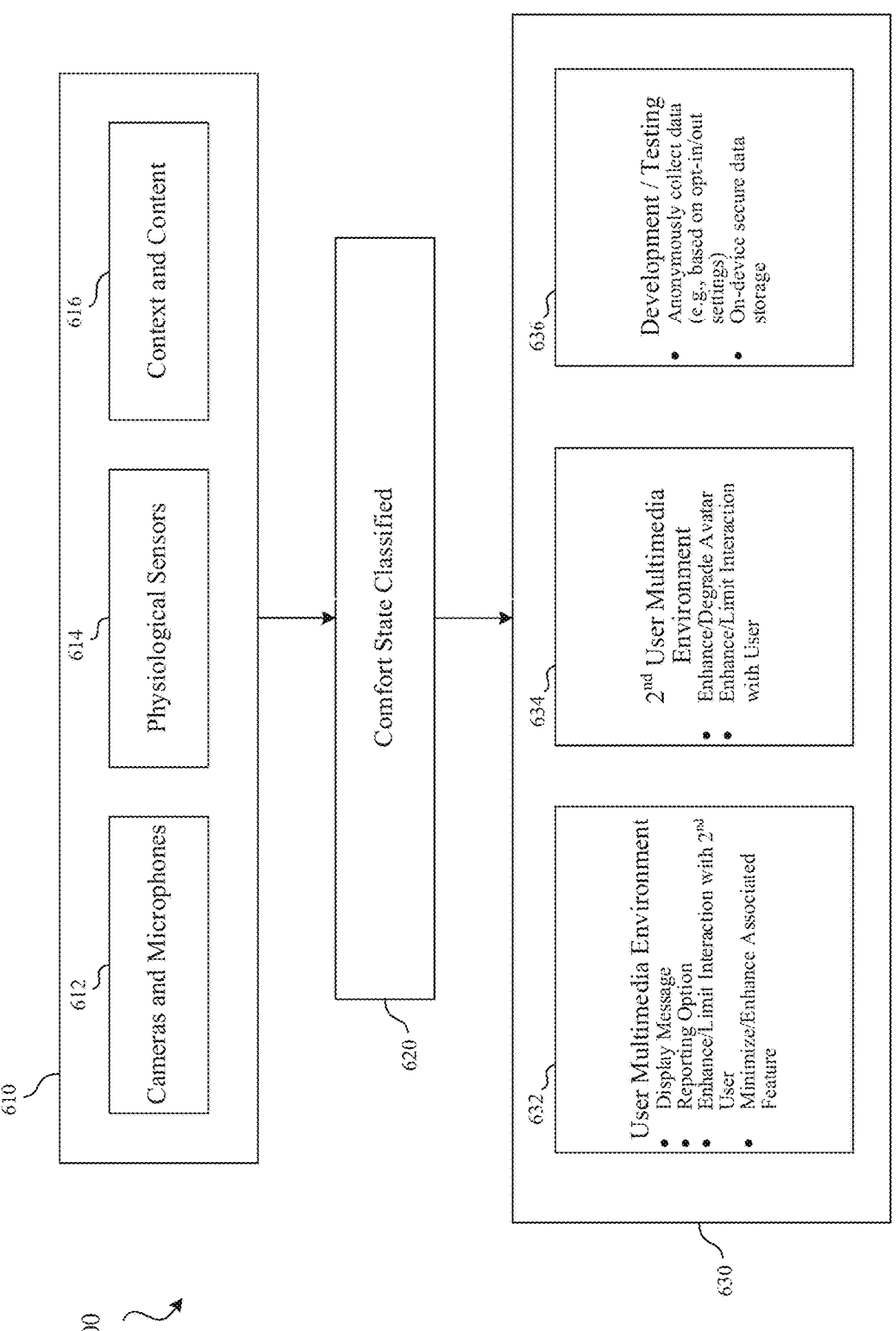
FIG. 6 is a chart illustrating inputs for obtaining data regarding a body of the user, classification of a comfort state and updating a multimedia environment.

FIG. 6 is a chart 600 illustrating inputs for obtaining data regarding a body of the user, classification of a comfort state and updating a multimedia environment. As shown in block 610, examples of data inputs regarding the body of the user 110 may include cameras and microphones 612, physiological sensors 614, and context and content 616 (e.g., context or content associated with the user, a second user, or the multimedia environment).

As shown in block 620, a comfort state is classified based on the data regarding the body of the user collected in block 610.

As shown in block 630, a user multimedia environment 632 may be updated based on the classification of the comfort state in block 620, for example, to include a display message, a reporting option, to enhance or limit interaction with a second user, or to minimize or enhance a feature associated with the comfort state.

As shown in block 630, a second user multimedia environment 634 may be updated based on the classification of the comfort state in block 720, for example, by enhancing or degrading an avatar of the second user or enhancing or limiting interaction of the second user with the first user.

As shown in block 630, development or testing 636 may be performed by a developer or content creator based on the classification of the comfort state in block 620, for example, by anonymously collecting data (e.g., based on opt-in/out settings) or utilizing on-device secure data storage.

Figure 7:
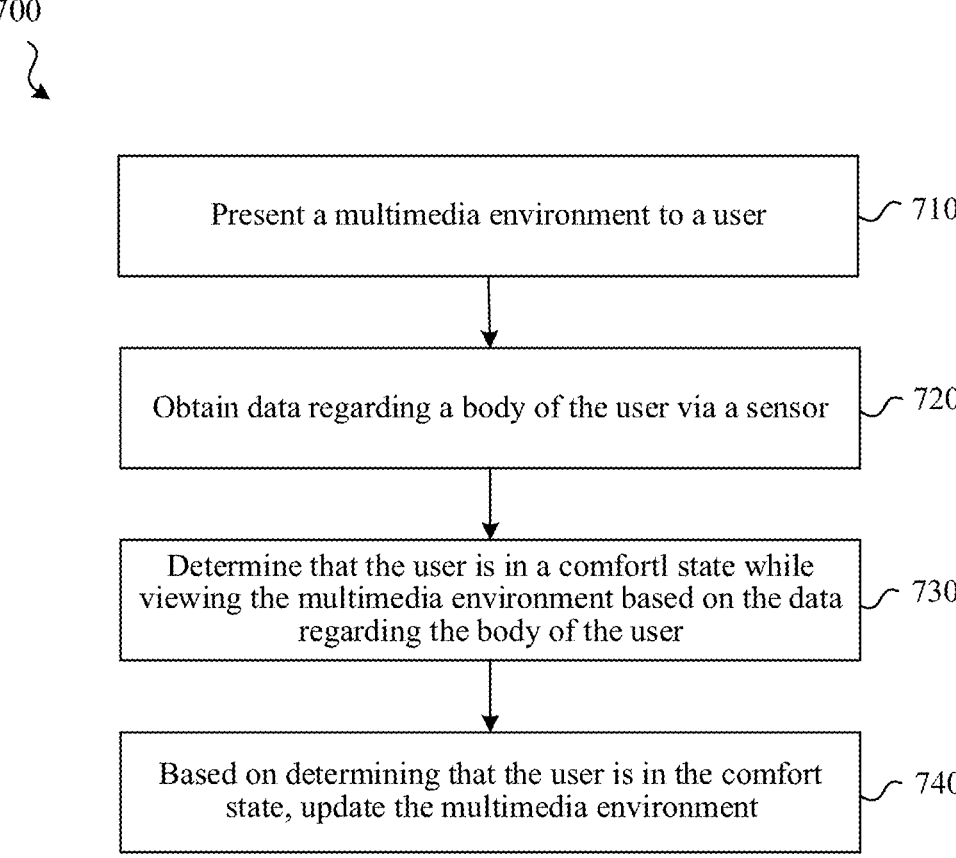
FIG. 7 is a flowchart illustrating an exemplary method of updating a multimedia environment, according to some implementations.

FIG. 7 is a flowchart illustrating an exemplary method of updating a multimedia environment, according to some implementations. In some implementations, the method 700 is performed by a device (e.g., device 120 of FIGS. 1-5). The method 700 may be performed at a mobile device, HMD, desktop, laptop, server device, or by multiple devices in communication with one another. In some implementations, the method 700 is performed by processing logic, including hardware, firmware, software, or a combination thereof. In some implementations, the method 700 is performed by a processor executing code stored in a non-transitory computer-readable medium (e.g., a memory).

At block 710, the method 700 presents a multimedia environment to a user. For example, a CGR environment may be presented to the user on an HMD and may involve a co-presence of multiple users interacting with one another and the content of the environment.

At block 720, the method 700 obtains data regarding a body of the user via a sensor. In some implementations, inward facing cameras record eye characteristics, downward-facing cameras record facial expressions, or image-based hand/body tracking is used to identify movements. In some implementations, one or more additional sensors or types of input (e.g., camera, motion sensor, heart rate sensor, pulse oximeter, blood pressure sensor, temperature sensor, electro-cardiogram sensor, etc.) may be obtained.

At block 730, the method 700 determines that the user is in a comfort state while viewing the multimedia environment based on the data regarding the body of the user. In some implementations, comfort states are classified by identifying body movement or characteristics of the user and associating the identified body movement or characteristic with a comfort state. In some implementations, multiple forms of body data are utilized to increase the accuracy of classification of comfort state. For example, a machine learning algorithm may classify the comfort state based on the user's eye characteristics, facial expressions, body movements, and other physiological data (e.g., heartrate, temperature, electro-cardiogram, etc.).

In some implementations, the comfort state is determined using a statistical or machine learning-based classification technique. In some implementations, body data is aggregated and classified into different comfort states using statistical or machine-learning based techniques. For example, a machine-learning model may be trained to classify a facial expression into one or a fixed number of classes of comfort states. In one example, a facial expression is classified as happy, unhappy, or neutral.

Users will have the option to opt in or out with respect to whether his or her user data is obtained or used or to otherwise turn on and off any features that obtain or use user information. Moreover, each user will have the ability to access and otherwise find out anything that the system has collected or determined about him or her. User data is stored securely on the user's device. For example, user data associated with the user's body and/or comfort state may be stored in a secure enclave on a user's device, restricting access to the user data and restricting transmission of the user data to other devices.

At block 740, based on determining that the user is in the comfort state, the method 700 updates the multimedia environment. In some implementations, the method 700 provides feedback to the user based on the user's comfort state. For example, the method 700 may provide a notification for the user to take a break or change the content. In some implementations, updating the multimedia environment includes displaying a message to make the user aware of his or her comfort state, suggesting a break, providing an option to block content or individuals, providing an option to report, offering alternative content; or notifying a guardian/moderator. In some implementations, updating the multimedia environment includes updating the environment of another user.

In some implementations, the method 700 provides feedback to a content creator to facilitate improvements to the content or future/related content. A notification may identify a portion of the content associated with a comfort state for one or more users, e.g., identifying that during a particular portion of the content users were more prone to a comfort state than during another portion of the content. In some implementations, comfort state data for multiple users who have viewed the content is aggregated to provide feedback regarding the content. The content creator may revise the content based on such feedback to enhance or minimize the likelihood of users experiencing the comfort state.

In some implementations, content is automatically adjusted or presented according to automatically-determined display parameters based on a user's comfort state. For example, content may be blocked, reported, replaced, or enhanced based on determining that the user is in a particular comfort state.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of data to improve a user's experience of an electronic device with respect to using electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users or a parent of the user if the user falls within an age of parental consent. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a device comprising a processor and a display;
obtaining data associated with a comfort state of a user while presenting a view of computer-generated reality (CGR) multimedia environment on the display during a first period of time, the comfort state determined based on sensor data associated with a body of the user;
determining that the data associated with the comfort state is a particular comfort state; and
in response to determining that the data associated with the comfort state of the user is the particular comfort state, updating the view of the CGR multimedia environment on the display for a second period of time by providing a feedback mechanism, wherein the feedback mechanism is selected based on the particular comfort state and content associated with the view of the CGR multimedia environment on the display.

2. The method of claim 1, wherein the feedback mechanism associated with updating the multimedia environment comprises displaying a message that provides an awareness of the particular comfort state.

3. The method of claim 1, wherein the feedback mechanism associated with updating the multimedia environment comprises displaying a notification to take a break from the multimedia environment.

4. The method of claim 1, wherein the feedback mechanism associated with updating the multimedia environment comprises providing an option to block content or block a user from the multimedia environment.

5. The method of claim 1, wherein the feedback mechanism associated with updating the multimedia environment comprises providing an option to report content or report another user in the multimedia environment to an authority, guardian, or moderator.

6. The method of claim 1, wherein the feedback mechanism associated with updating the multimedia environment comprises updating another multimedia environment of another user.

7. The method of claim 1, wherein the feedback mechanism associated with updating the multimedia environment comprises updating a multimedia representation of another user.

8. The method of claim 1, wherein determining that the data associated with the comfort state is the particular comfort state is based on classifying the comfort state as a particular comfort state from amongst a plurality of predefined classes of comfort states.

9. The method of claim 1, wherein determining that the data associated with the comfort state is the particular comfort state is based on a context selected from a group consisting of a setting of a physical environment or the multimedia environment, a sensitivity, a history of comfort states, and an activity.

10. The method of claim 1, wherein determining that the data associated with the comfort state is the particular comfort state is based on at least one of a tone of voice, a spoken language, an utterance, or breathing.

11. The method of claim 1, wherein the sensor data for determining the comfort state comprises at least two of:
an image captured by a camera sensor;
a motion captured by a motion sensor;
a heart rate captured by a heart rate sensor;
a blood oxygen level captured by a pulse oximeter sensor;
a blood pressure captured by a blood pressure sensor;
a temperature captured by a thermometer sensor; and
an electro-cardiogram (EKG) captured by an EKG sensor.

12. The method of claim 1, wherein determining that the data associated with the comfort state is the particular comfort state is based on a machine learning algorithm.

13. The method of claim 1, further comprising:
recording information associated with the data regarding the body, the comfort state, or the updating of the multimedia environment.

14. The method of claim 1, wherein the data regarding the body and the data associated with the comfort state is stored in a secure enclave on the device to restrict access and transmission to other devices.

15. The method of claim 1, wherein the device is a head-mounted device (HMD) and the multimedia environment comprises a computer-generated reality (CGR) environment.

16. A device comprising:
a display;
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining data associated with a comfort state of a user while presenting a view of computer-generated reality (CGR) multimedia environment on the display during a first period of time, the comfort state determined based on sensor data associated with a body of the user;
determining that the data associated with the comfort state is a particular comfort state; and
in response to determining that the data associated with the comfort state of the user is the particular comfort state, updating the view of the CGR multimedia environment on the display for a second period of time by providing a feedback mechanism, wherein the feedback mechanism is selected based on the particular comfort state and content associated with the view of the CGR multimedia environment on the display.

17. The device of claim 16, wherein the feedback mechanism associated with updating the multimedia environment comprises at least one of: i) displaying a message that provides an awareness of the particular comfort state, and ii) displaying a notification to take a break from the multimedia environment.

18. The device of claim 16, wherein the feedback mechanism associated with updating the multimedia environment comprises at least one of: i) providing an option to block content or block a user from the multimedia environment; and ii) providing an option to report content or report another user in the multimedia environment to an authority, guardian, or moderator.

19. The device of claim 16, wherein the feedback mechanism associated with updating the multimedia environment comprises at least one of: i) updating another multimedia environment of another user, and ii) updating a multimedia representation of another user.

20. A non-transitory computer-readable storage medium, storing program instructions executable via one or more processors to perform operations comprising:

obtaining data associated with a comfort state of a user while presenting a view of computer-generated reality (CGR) multimedia environment on a display during a first period of time, the comfort state determined based on sensor data associated with a body of the user;

determining that the data associated with the comfort state is a particular comfort state; and in response to determining that the data associated with the comfort state of the user is the particular comfort state, updating the view of the CGR multimedia environment on the display for a second period of time by providing a feedback mechanism, wherein the feedback mechanism is selected based on the particular comfort state and content associated with the view of the CGR multimedia environment on the display.

* * * * *